June 1, 1937.  N. HERZMARK  2,082,054

PIPE JOINT

Filed May 28, 1934

Inventor:
Nicolas Herzmark,
By Smith, Michael & Gardiner,
Attorneys.

Patented June 1, 1937

2,082,054

UNITED STATES PATENT OFFICE 2,082,054

PIPE JOINT

Nicolas Herzmark, Paris, France

Application May 28, 1934, Serial No. 728,001
In Great Britain May 31, 1933

2 Claims. (Cl. 285—86)

This invention has reference to pipe joints or couplings adapted for connecting pipes to cocks, tanks or pipe fittings or for connecting the ends of pipes together by means of an intermediate double-ended fitting.

My invention has for its main object to provide an improved pipe joint or coupling of the kind in which one member is formed with a cone of small apical angle for supporting the flared end of the pipe, and a nut formed integrally with a conical socket is then screwed over the first member, thus drawing its socket on to the flared end of the pipe and pressing the latter against the supporting cone.

An object of my invention is to provide a pipe joint or coupling of the above kind which is particularly suitable for withstanding high pressures of the fluid within the pipe line, the joint being effectively tightened by moderate force and being readily disconnectible.

Another object of my invention is to provide a pipe joint or coupling of the above kind which comprises a minimum number of separate parts, so that it can be readily assembled and disconnected even under difficult working conditions.

Other objects of my invention will appear from the description given hereafter with reference to the accompanying drawing, in which:—

Figure 1:
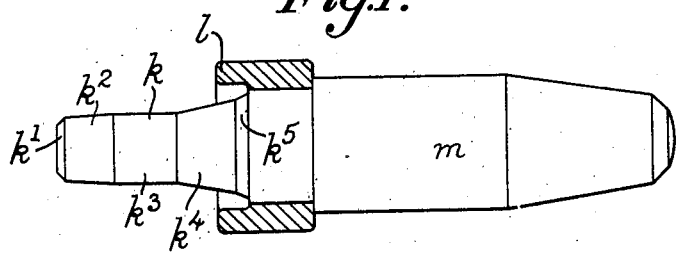
Figure 2:
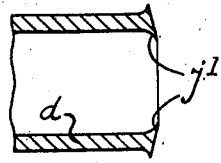
Figure 3:
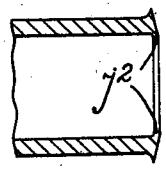
Figure 4:
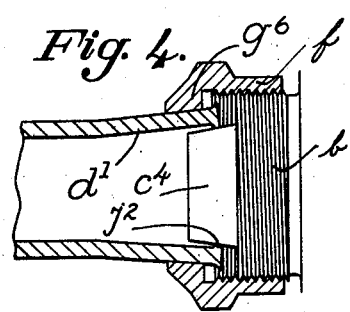

Fig. 1 is a part sectional elevation of a suitable tool for shaping the pipe end, and, Figs. 2 to 4 are sectional elevations showing the application of my invention to a hard metal pipe as cut to length by a pipe-cutter of the ordinary type.

The shaping of the pipe end $d$ can be effected by any suitable device, but a tool for that purpose is illustrated in Fig. 1. This consists of a stem $k$ projecting from a cup $l$ fitted with a handle $m$. This stem at its outer end has a flattened cone portion $k^1$, continued by a hardly conical (almost cylindrical) portion $k^2$ to a definitely cylindrical and guiding portion $k^3$, and the latter is connected with the cup member $l$ by a portion $k^4$ of truncated-cone section (the cone being sharper than the flattened cone $k^1$) followed by a shorter and flatter truncated-cone section $k^5$.

The cup member $l$ is so profiled interiorly that it guides and steadies the flared end $d^1$ of the pipe. This tool enables me to avoid splitting a welded tube, whilst keeping the interior of the tube circular and the exterior concentric with the interior.

Figs. 2, 3 and 4 illustrate my preferred method of producing a yielding or adaptable layer between the interior of the pipe, and the pipe-supporting cone. In this example, the burr formed when severing the pipe, for example by a pipe-cutter of the well known type having cutter-discs, is shaped to constitute the intermediate ring or layer. The burr is indicated at $j^1$ in Fig. 2, and in Fig. 3 it has been shaped to form a narrow inwardly projecting flange $j^2$ constituting a continuous annular bearing surface. Fig. 4 shows the socket member $g^6$ and the pipe-supporting cone $c^4$ in place.

Where the burr $j^1$ is utilized in this way, it can be shaped by the tool $k\ l\ m$ shown in Fig. 1 into the very narrow flange $j^2$ of Fig. 3 extending inwardly of the bore of the pipe and constituting a continuous bearing surface of adaptable metal. This bearing surface $j^2$ is drawn along a supporting cone $c^4$ extending from an externally screw-threaded member $b$, until it makes a perfect joint therewith, as the trailing socket $g^6$ is screwed home and rotated upon the exterior of the flared pipe end $d^1$.

The tool $k\ l\ m$ employed to form the burr $j^1$ into the inwardly directed annular flange $j^2$ which provides the contact surface with the supporting cone, gives the further advantage that the flared end of the pipe need not be opened out so much because the flange $j^2$ is integral with such flared end. The flattened extremital cone $k^1$ of the stem first pushes radially outwards the burr $j^1$ caused by the pipe-cutting discs, and the hardly conical portion $k^2$ smoothes and completes this displacement of the burr against the inner wall of the flared end. The cylindrical portion $k^3$ of the stem acts as a guide and the truncated-conical portion $k^4$ of the stem (sharper than the flattened cone) opens out the end portion of the pipe to provide the desired flare $d^1$.

It will be noted that in all cases, the trailing conical socket $g^6$ integral with the nut $f$ is engaged with and rotated relatively to the externally threaded member $b$ from which the pipe-supporting cone $c^4$ projects. This arrangement enables the screw-threaded portions to be kept to a diameter very little greater than the external diameter of the flared end $d^1$ of the pipe, whereas in the known form of coupling by externally threaded sleeves with coned bores, the internally threaded sockets must be of considerably larger diameter than the pipes.

This improved coupling is inexpensive to make and easy to fit or to separate; it has very few component parts, and it provides a liquid-tight joint even where as in the case of fuel pipes on automobile vehicles, motor boats or airplanes, the coupling is subjected to considerable vibration.

What I claim is:—

1. In a hard-metal pipe joint, the combination of a flared pipe end having a narrow internal flange at its open end, a conical member engaged by said flange, a coupling member having an internally conical socket portion engaging said pipe end behind its open end and a nut integral with said socket portion, and an externally screw-threaded member supporting said conical member, said nut engaging with said screw-threaded member and causing the conical socket portion of said coupling member to draw said pipe end along said conical member.

2. In a joint for hard-metal pipes, the combination of a flared pipe end having a narrow internal flange at its open end, said flange being formed by tooling the internal burr resulting from cutting the pipe so as to constitute a continuous bearing surface of metal, a conical member engaged by said flange, a coupling member having an internally conical socket portion engaging said pipe end behind its open end and a nut integral with said socket portion, and an externally screw-threaded member supporting said conical member, said nut engaging with said screw-threaded member and causing the conical socket portion of said coupling member to draw said pipe end along said conical member.

NICOLAS HERZMARK.